(12) United States Patent
Furukawa et al.

(10) Patent No.: US 10,818,168 B2
(45) Date of Patent: Oct. 27, 2020

(54) DRIVING SUPPORT DEVICE, DRIVING SUPPORT METHOD, AND PROGRAM

(71) Applicant: TOYOTA JIDOSHA KABUSHIKI KAISHA, Toyota-shi, Aichi-ken (JP)

(72) Inventors: Daisuke Furukawa, Chofu (JP); Takeshi Inoshita, Kashiwa (JP); Ryota Okubi, Funabashi (JP); Ryotaro Fujiwara, Tokyo (JP); Ko Koga, Tokyo (JP); Toshiyuki Hagiya, Shiki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/565,939

(22) Filed: Sep. 10, 2019

(65) Prior Publication Data
US 2020/0160696 A1    May 21, 2020

(30) Foreign Application Priority Data
Nov. 19, 2018 (JP) .................................. 2018-216840

(51) Int. Cl.
*G08G 1/00* (2006.01)
*G08G 1/01* (2006.01)
*H04W 4/44* (2018.01)

(52) U.S. Cl.
CPC ......... *G08G 1/0141* (2013.01); *G08G 1/0133* (2013.01); *H04W 4/44* (2018.02)

(58) Field of Classification Search
None
See application file for complete search history.

(56) References Cited

U.S. PATENT DOCUMENTS

2008/0021632 A1* 1/2008 Amano ................. G01C 21/26 701/117
2018/0356837 A1* 12/2018 Lisewski .............. G01S 5/0027
2019/0195646 A1* 6/2019 Iwai ..................... G08G 1/0133

FOREIGN PATENT DOCUMENTS

JP    2007-178124 A    7/2007

* cited by examiner

*Primary Examiner* — Brent Swarthout
(74) *Attorney, Agent, or Firm* — Oliff PLC

(57) ABSTRACT

A driving support device includes a memory and a processor including hardware. When a vehicle is placed inside a rest facility and at least one of parameters indicative of respective states of traffic jams on roads ahead of and behind the rest facility satisfy a predetermined reference, the processor transmits, to a device related to the vehicle, information that proposes a departure from the rest facility.

7 Claims, 7 Drawing Sheets

DRIVING SUPPORT DEVICE, DRIVING SUPPORT METHOD, AND PROGRAM

INCORPORATION BY REFERENCE

The disclosure of Japanese Patent Application No. 2018-216840 filed on Nov. 19, 2018 including the specification, drawings and abstract is incorporated herein by reference in its entirety.

BACKGROUND

1. Technical Field

The disclosure relates to a driving support device, a driving support method, and a program each for notifying a user of traffic jam states on roads ahead of and behind a rest facility.

2. Description of Related Art

In terms of a driving support device such as a car navigation system, there has been known a technology to notify a user of a traffic jam state ahead of a rest facility provided in an express highway or the like before the user takes a break in the rest facility (e.g., see Japanese Unexamined Patent Application Publication No. 2007-178124 (JP 2007-178124 A)). In this technology, the driving support device determines whether or not a traffic jam occurs ahead of the rest facility based on traffic information including traffic jam information, and when the traffic jam occurs, the driving support device forms traffic jam prediction information per elapsed time if the user takes a break in the rest facility and notifies the user of the traffic jam prediction information before the user takes a break.

SUMMARY

In the meantime, the traffic jam changes with time. However, in JP 2007-178124 A, the traffic jam is predicted and notified before the user takes a break, and therefore, even when the traffic jam is solved during the break and a suitable timing to depart from the rest facility comes, this information cannot be informed to the user.

The disclosure is accomplished in view of the above problems, and an object of the disclosure is to provide a driving support device, a driving support method, and a program each of which notifies a user of information corresponding to a change of traffic jam states of roads ahead of and behind a rest facility.

In order to solve the above problems and achieve the above object, a driving support device of the present disclosure includes a memory and a processor including hardware. The processor determines, based on positional information of a vehicle, whether or not the vehicle is placed inside a rest facility. The processor determines, based on respective pieces of running data of a plurality of running vehicles running on roads ahead of and behind the rest facility, whether at least one of parameters indicative of respective states of traffic jams on the roads ahead of and behind the rest facility satisfy a predetermined reference or not. When the vehicle is placed inside the rest facility and the at least one of the parameters satisfy the predetermined reference, the processor transmits, to a device related to the vehicle, information that proposes a departure from the rest facility.

Further, the processor may determine, based on the positional information of the vehicle, whether or not a predetermined time has elapsed after the vehicle is placed inside the rest facility. In a case where the vehicle is placed inside the rest facility and the at least one of parameters satisfy the predetermined reference, when the predetermined time has elapsed after the vehicle is placed inside the rest facility, the processor may transmit the information.

In this configuration, in a case where the vehicle is placed inside the rest facility and the parameters indicative of the states of the traffic jams on the roads ahead of the rest facility satisfy the predetermined reference, when the predetermined time has elapsed after the vehicle is placed inside the rest facility, the processor transmits the information that proposes a departure from the rest facility. Accordingly, a user of the vehicle can depart from the rest facility at a timing when the user takes a sufficient rest.

Further, the processor may determine, based on respective pieces of positional information of the vehicles, whether or not the number of vehicles placed inside the rest facility is at least a predetermined number. In a case where the vehicle is placed inside the rest facility and the at least one of the parameters satisfy the predetermined reference, when the number of vehicles placed inside the rest facility is at least the predetermined number, the processor may transmit service information usable in the rest facility to respective devices related to the vehicles placed inside the rest facility.

In this configuration, in a case where the vehicle is placed inside the rest facility and the parameter indicative of the state of the traffic jam on the road ahead of the rest facility satisfies the predetermined reference, when the number of vehicles placed inside the rest facility is at least the predetermined number, the processor transmits service information usable in the rest facility to respective devices related to the vehicles placed inside the rest facility. Accordingly, even when a timing of a departure from the rest facility comes, the predetermined number or more of vehicles that can depart from the rest facility are held back in the rest facility, so that it is possible to prevent a traffic jam from being caused ahead of the rest facility.

Further, the processor may determine, based on running data of the vehicle, whether or not a running distance of the vehicle is at least a specified value. When the running distance of the vehicle is at least the specified value, the processor may transmit the service information.

In this configuration, in a case where the running distance of the vehicle is the specified value or more, the processor transmits the service information usable in the rest facility to the device related to the vehicle placed in the rest facility. Hereby, a user who is assumed to be more tired than other users in the rest facility is held back in the rest facility, so that the user can recover from fatigue.

Further, when the parameters do not satisfy the predetermined reference, the processor may transmit traffic jam information indicative of follow-up states of the traffic jams per predetermined time to the device related to the vehicle.

In this configuration, when the parameter indicative of the state of the traffic jam on the road ahead of the rest facility does not satisfy the predetermined reference, the processor transmits the traffic jam information indicative of the follow-up state of the traffic jam every predetermined time to the device related to the vehicle. Accordingly, even when the user of the vehicle is not notified of information that proposes a departure from the rest facility from the driving support device, the user can grasp the tendency of the states of the traffic jams ahead of and behind the rest facility in real time, so that the user can predict a suitable timing for a departure time from the rest facility.

A driving support method according to the disclosure is a driving support method executed by a driving support device, and the driving support method includes: reading positional information of a vehicle from a memory; determining, based on the positional information, whether or not the vehicle is placed inside a rest facility; reading, from the memory, respective pieces of running data of a plurality of running vehicles running on roads ahead of and behind the rest facility; determining, based on the respective pieces of running data of the running vehicles, whether at least one of parameters indicative of respective states of traffic jams on the roads ahead of and behind the rest facility satisfy a predetermined reference or not; and when the vehicle is placed inside the rest facility and the at least one of the parameters satisfy the predetermined reference, transmitting, to a device related to the vehicle, information that proposes a departure from the rest facility.

A program according to the disclosure is a program to be executed by a driving support device, and the program causes the driving support device to: determine, based on positional information of a vehicle, whether or not the vehicle is placed inside a rest facility; determine, based on respective pieces of running data of a plurality of running vehicles running on roads ahead of and behind the rest facility, whether at least one of parameters indicative of respective states of traffic jams on the roads ahead of and behind the rest facility satisfy a predetermined reference or not; and when the vehicle is placed inside the rest facility and the at least one of the parameters satisfy the predetermined reference, transmit, to a device related to the vehicle, information that proposes a departure from the rest facility.

With the disclosure, in a case where the vehicle is placed inside the rest facility and the parameter indicative of the state of the traffic jam on the road ahead of the rest facility satisfies the predetermined reference, the processor transmits, to the device related to the vehicle, the information that proposes a departure from the rest facility. This accordingly yields such an effect that the user can be notified of information corresponding to changes of the traffic jam states of the roads ahead of and behind the rest facility.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Embodiments will be described below in detail with reference to the drawings. Note that the disclosure is not limited to the following embodiments. Further, in the following description, the same element has the same reference sign.

Embodiment 1

Driving Support System

Figure 1:
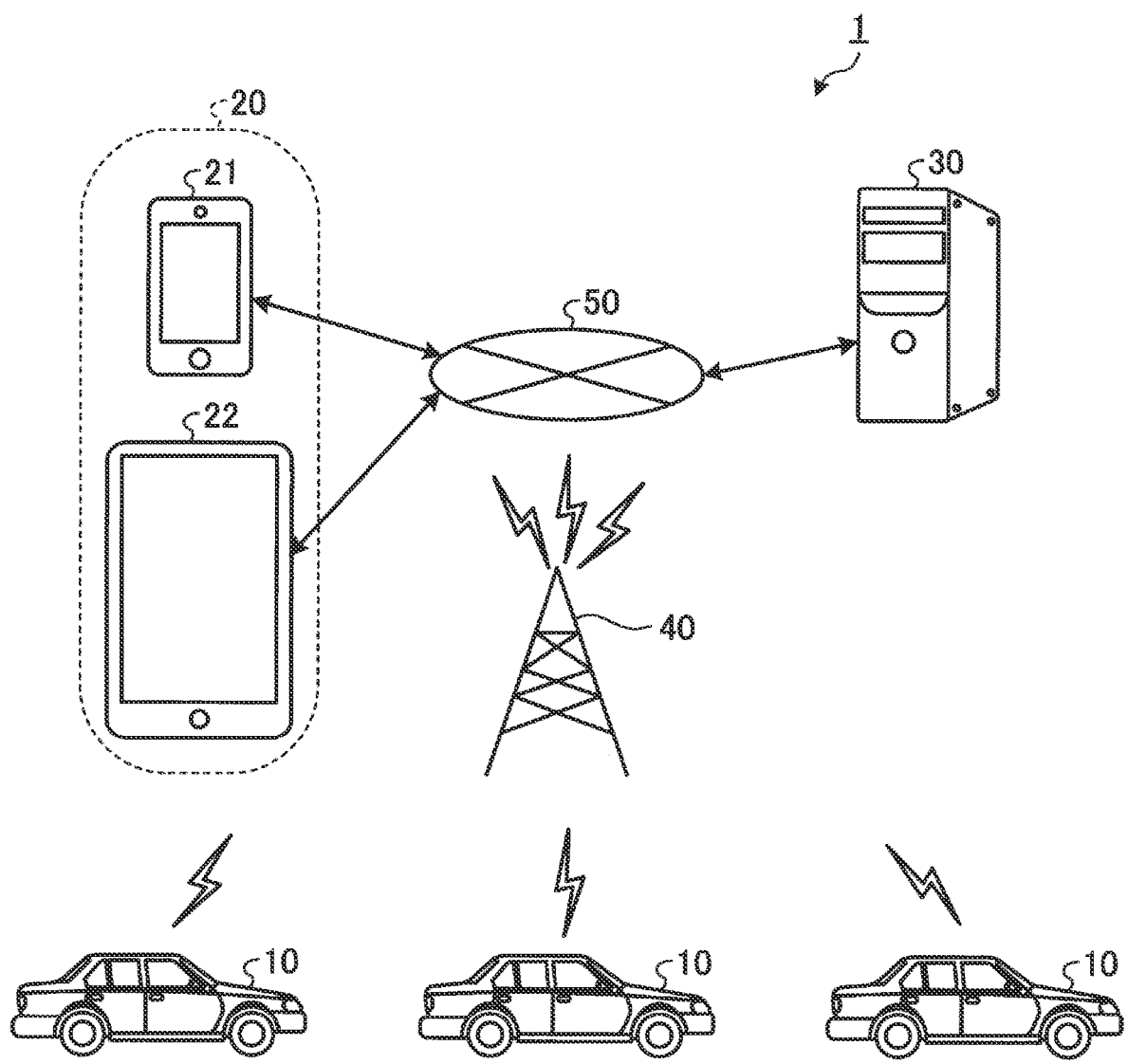
FIG. 1 is a schematic view illustrating a schematic configuration of a driving support system according to Embodiment 1.

First described is a driving support system according to Embodiment 1. FIG. 1 is a schematic view illustrating a schematic configuration of the driving support system according to Embodiment 1. The driving support system 1 illustrated in FIG. 1 includes a plurality of vehicles 10, a user terminal device 20, and a driving support device 30. The vehicles 10, the user terminal device 20, and the driving support device 30 are configured to be communicable with each other via a base station 40 and a network 50. Further, the user terminal device 20 is a mobile phone 21 such as a smartphone or a tablet-type terminal device 22, for example.

Configurations of Vehicle and Driving Support Device

Figure 2:
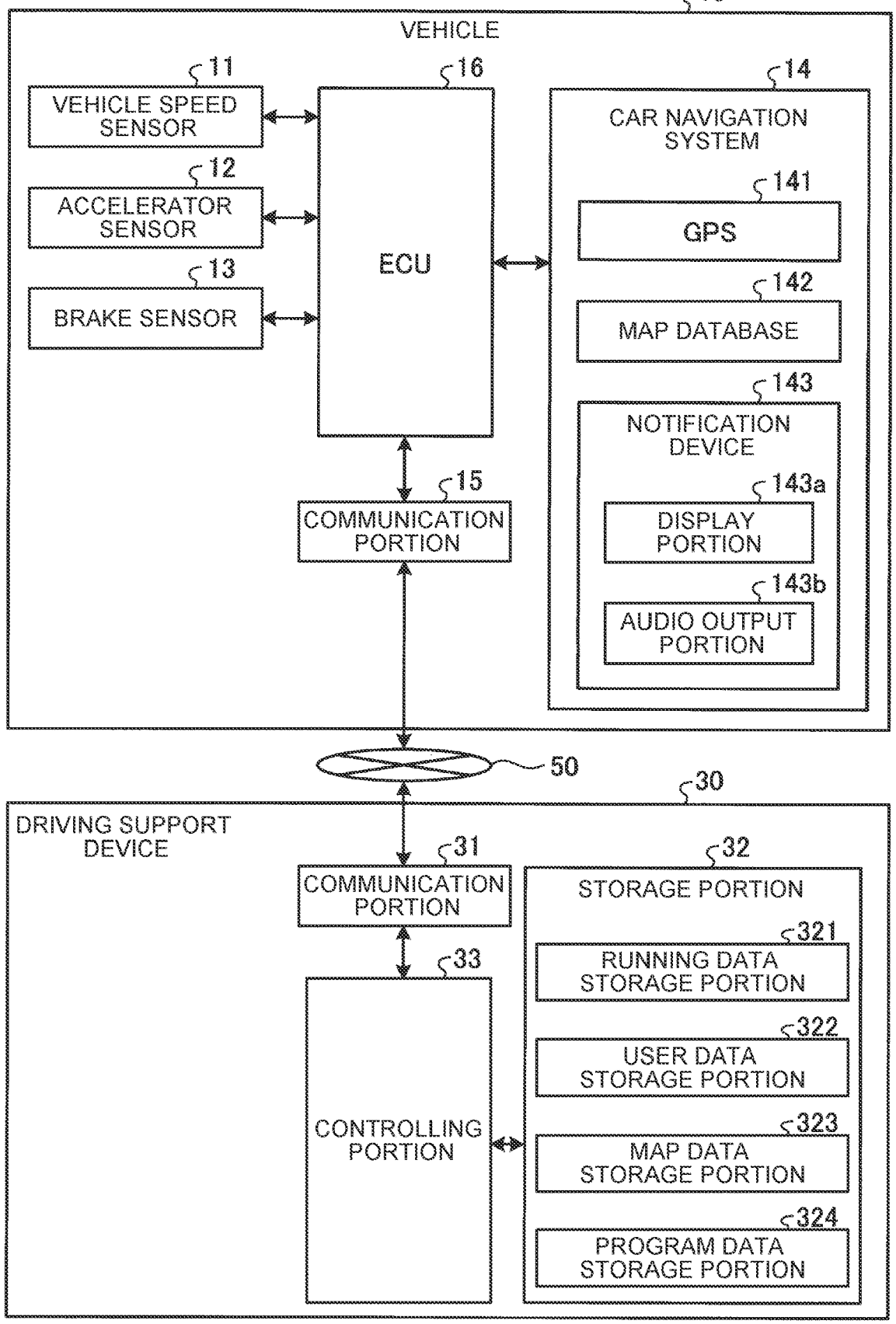
FIG. 2 is a block diagram illustrating functional configurations of a vehicle and the driving support device according to Embodiment 1.

FIG. 2 is a block diagram illustrating functional configurations of the vehicle 10 and the driving support device 30. First described is the configuration of the vehicle 10. The vehicle 10 illustrated in FIG. 2 includes a vehicle speed sensor 11, an accelerator sensor 12, a brake sensor 13, a car navigation system 14, a communication portion 15, and an electronic control unit (ECU) 16.

The vehicle speed sensor 11 detects a vehicle speed at the time of running of the vehicle 10 and outputs this detection result to the ECU 16.

The accelerator sensor 12 detects an operation amount of an accelerator pedal (not shown) provided in the vehicle 10 and outputs this detection result to the ECU 16.

The brake sensor 13 detects an operation amount of a brake pedal (not shown) provided in the vehicle 10 and outputs this detection result to the ECU 16.

The car navigation system 14 includes a global positioning system (GPS) 141, a map database 142, and a notification device 143.

The GPS 141 receives a signal from a GPS satellite and calculates a position of the vehicle 10 based on the received signal. The GPS 141 is constituted by a GPS reception sensor or the like.

In the map database 142, various pieces of map data are stored. The map database 142 is constituted by use of a recording medium such as a hard disk drive (HDD) or a solid state drive (SSD).

The notification device 143 includes a display portion 143a on which an image, a video, and text information are displayed, and an audio output portion 143b configured to output sound such as voice or warning sound. The display portion 143a is constituted by use of a display panel such as a liquid crystal panel or an organic electroluminescence (EL) panel. The audio output portion 143b is constituted by a speaker or the like.

Under a control by the ECU 16, the car navigation system 14 configured as such puts a current position, of the vehicle 10, acquired by the GPS 141 on map data stored in the map database 142, so as to notify the user of information including a road where the vehicle 10 currently runs, a route to a rest facility and a destination, and so on via the display portion 143a and the audio output portion 143b. Here, the rest facility is a facility which includes at least one of a store, a refueling station, and a restroom and in which the user can stop the vehicle 10 and take a break.

Under a control by the ECU 16, the communication portion 15 transmits various pieces of information and receives various pieces of information in accordance with a predetermined telecommunications standard via the base station 40 and the network 50. Further, under a control by the ECU 16, the communication portion 15 transmits various pieces of information to other vehicles 10, the user terminal device 20, and so on and receives various pieces of information from other vehicles 10, the user terminal device 20, and so on in accordance with a predetermined telecommunications standard. The communication portion 15 is constituted by use of a radio-communicable communication module.

The ECU 16 controls operations of various portions constituting the vehicle 10. The ECU 16 is constituted by use of a memory and a processor including hardware such as a central processing unit (CPU). The ECU16 transmits, to the driving support device 30 via the communication portion 15, respective detection results from the vehicle speed sensor 11, the accelerator sensor 12, and the brake sensor 13 and positional information of the vehicle 10 acquired by the car navigation system 14.

Next will be described the configuration of the driving support device 30. The driving support device 30 illustrated in FIG. 2 includes a communication portion 31, a storage portion 32, and a controlling portion 33.

Under a control by the controlling portion 33, the communication portion 31 transmits various pieces of information in accordance with a predetermined telecommunications standard via the base station 40 and the network 50 and receives various pieces of information. Further, under a control by the controlling portion 33, the communication portion 31 transmits various pieces of information to the vehicle 10, the user terminal device 20, and so on in accordance with the predetermined telecommunications standard and receives various pieces of information from the vehicle 10, the user terminal device 20, and so on. The communication portion 31 is constituted by use of a radio-communicable communication module.

The storage portion 32 is constituted by a semiconductor memory such as a read only memory (ROM) or a random access memory (RAM) and a storage medium such as a hard disk drive or SSD. The storage portion 32 includes: a running data storage portion 321 in which running data, of the vehicle 10, transmitted via the communication portion 31 is stored in association with individual information of the vehicle 10; a user data storage portion 322 in which a mail address of the user terminal device 20 related to the vehicle 10 is stored; a map data storage portion 323 in which map data including road information, a rest facility, and the like is stored, and a program data storage portion 324 in which various programs to be executed by the driving support device 30 are stored.

The controlling portion 33 is constituted by use of a memory and a processor including hardware such as a CPU. The controlling portion 33 determines, based on the positional information of the vehicle 10, whether the vehicle 10 is placed inside a rest facility or not, and further determines, based on respective pieces of running data of a plurality of running vehicles running on roads ahead of and behind the rest facility, whether at least one of parameters indicative of respective states of traffic jams on the roads ahead of and behind the rest facility satisfy a predetermined reference or not. When the vehicle 10 is placed inside the rest facility and the parameter indicative of the state of the traffic jam on the road ahead of the rest facility satisfies the predetermined reference, the controlling portion 33 transmits, to a device related to the vehicle 10, information that proposes a departure from the rest facility. Here, the parameter indicative of a state of a traffic jam (hereinafter just referred to as "parameter") is at least one or more of an average number of times of stop and go of the running vehicles running on the road (road link) within 10 km either ahead of or behind the rest facility within a predetermined time (e.g., within 10 minutes), an average speed of the running vehicles, and the number of stop times of the running vehicles. For example, when the average number of times of stop and go of the running vehicles is a specified value or less, the controlling portion 33 transmits, to the device related to the vehicle 10, the information that proposes a departure from the rest facility. Further, the device related to the vehicle 10 is at least either one of the car navigation system 14 and the user terminal device 20. Note that the controlling portion 33 may determine the parameter on the roads ahead of and behind the rest facility based on traffic information from an external server via the communication portion 31.

Process of Driving Support Device

Figure 3:
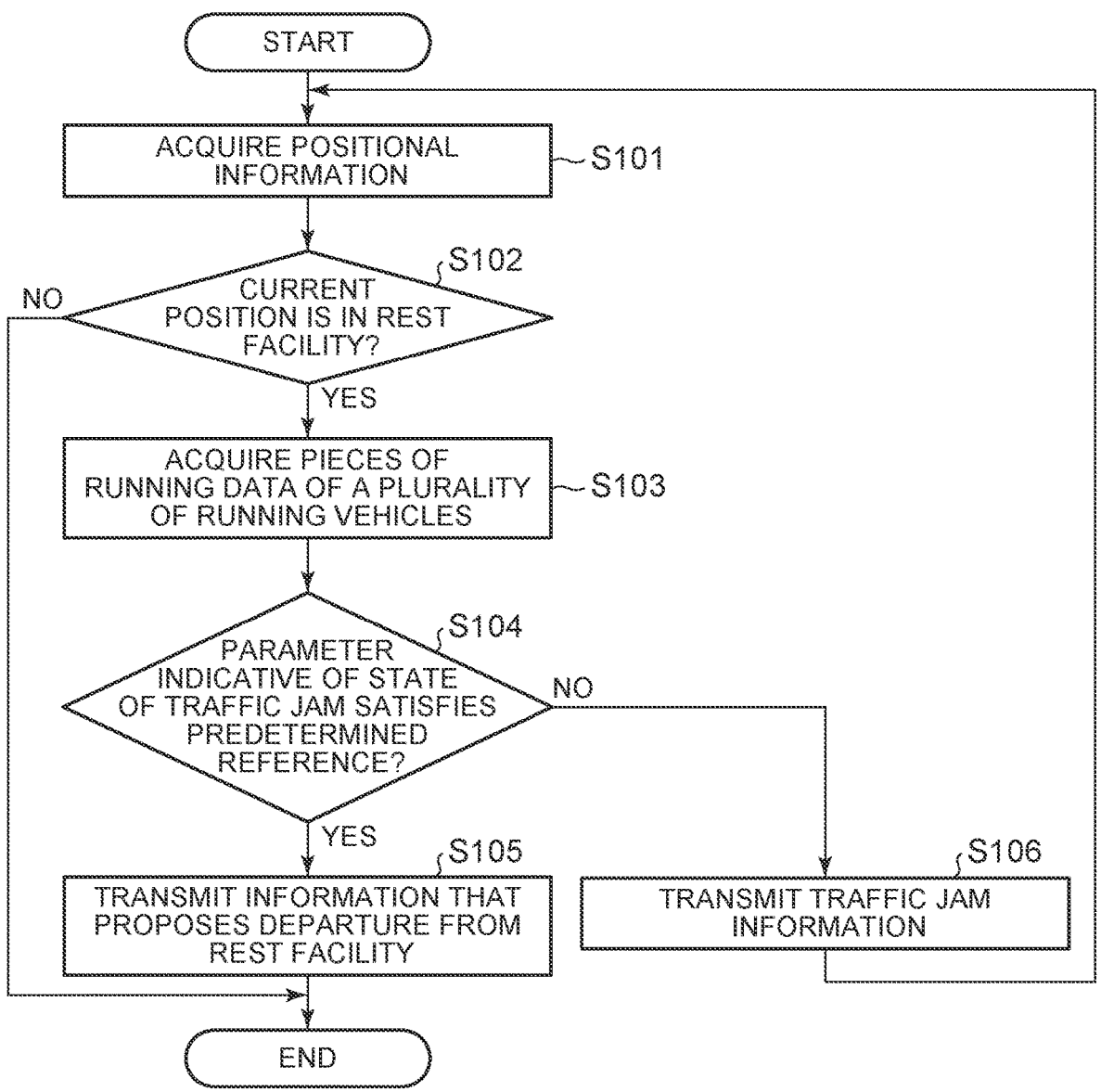
FIG. 3 is a flowchart illustrating the outline of a process executed by the driving support device according to Embodiment 1.

Next will be described a process executed by the driving support device 30. FIG. 3 is a flowchart illustrating the outline of the process executed by the driving support device 30. Note that, in order to simplify a description, the following description deals with a case where the driving support device 30 performs the process on one vehicle 10.

As illustrated in FIG. 3, first, the controlling portion 33 acquires positional information of the vehicle 10 via the communication portion 31 (step S101). More specifically, the controlling portion 33 acquires the positional information acquired by the GPS 141 of the car navigation system 14 via the communication portion 31.

Subsequently, the controlling portion 33 determines, based on the positional information of the vehicle 10 and the map data stored in the map data storage portion 323, whether a current position of the vehicle 10 is placed in the rest facility or not (step S102). When the current position of the vehicle 10 is placed in the rest facility (step S102: Yes), the controlling portion 33 acquires the positional information of the vehicle 10 and respective pieces of running data, of the running vehicles, stored in the running data storage portion 321 (step S103).

After that, the controlling portion 33 determines, based on the acquired respective pieces of running data of the running vehicles, whether the parameter indicative of the states of the traffic jams on the roads ahead of and behind the rest facility where the vehicle 10 stops satisfy the predetermined reference or not (step S104). When the parameter on the road ahead of the rest facility satisfies the predetermined reference (step S104: Yes), the controlling portion 33 transmits information that proposes a departure from the rest facility, to the device related to the vehicle 10, e.g., the user terminal device 20 (step S105). Hereby, the display 210 of the user terminal device 20 displays the information that proposes a departure from the rest facility, received from the driving support device 30 via the network 50. The information is, for example, a message, "please leave the rest facility five minutes later." As a result, the user of the vehicle 10 can grasp information corresponding to a change of the traffic jam. After step S105, the driving support device 30 finishes this process.

Figure 4:
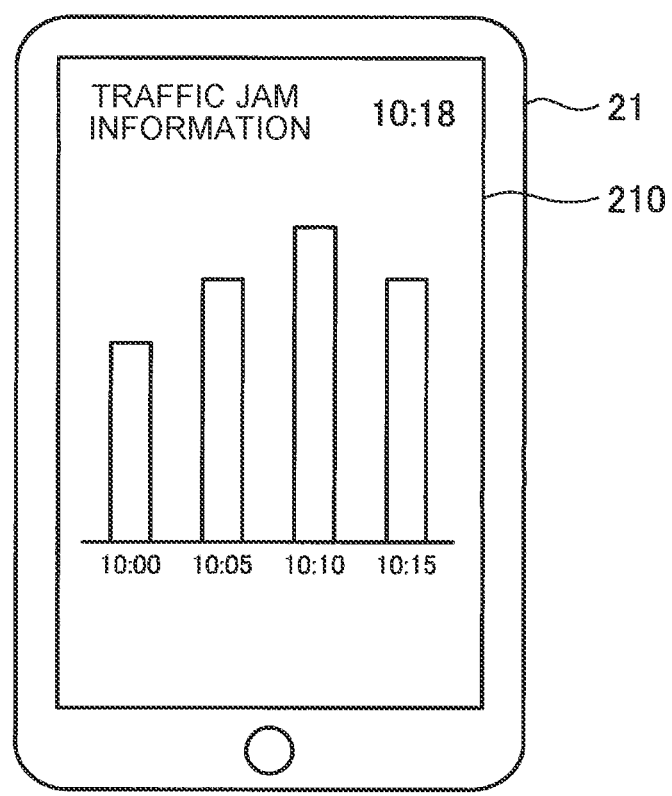
FIG. 4 is a view illustrating an example of traffic jam information displayed on a user terminal device according to Embodiment 1.

In step S104, when the parameter on the road ahead of the rest facility does not satisfy the predetermined reference (step S104: No), the controlling portion 33 transmits traffic jam information indicative of a state of the traffic jam per predetermined time to the device related to the vehicle 10 via the network 50 (step S106). Hereby, as illustrated in FIG. 4, the display 210 of the user terminal device 20 displays traffic jam information indicative of a follow-up state of the traffic jam per predetermined time, received from the driving support device 30 via the network 50. As a result, even when the user of the vehicle 10 is not notified of information that proposes a departure from the rest facility from the driving support device 30, the user can grasp the tendency of the states of the traffic jams ahead of and behind the rest facility in real time, so that the user can predict a suitable timing for a departure time from the rest facility. After step S106, the driving support device 30 returns to step S101.

In step S102, when the current position of the vehicle 10 is not in the rest facility (step S102: No), the driving support device 30 finishes this process.

With Embodiment 1 described above, when the vehicle 10 is placed inside the rest facility and the parameter ahead of the rest facility satisfies the predetermined reference, the controlling portion 33 transmits, to the device related to the vehicle 10, the information that proposes a departure from the rest facility. This makes it possible to notify the user of information corresponding to changes of the traffic jam states of the roads ahead of and behind the rest facility.

Further, with Embodiment 1, when the parameter ahead of the rest facility does not satisfy the predetermined reference, the controlling portion 33 transmits the traffic jam information indicative of the follow-up state of the traffic jam per predetermined time to the device related to the vehicle 10. As a result, even when the user is not notified of information that proposes a departure from the rest facility from the driving support device 30, the user can grasp the tendency of the states of the traffic jams ahead of and behind the rest facility in real time, so that the user can predict a suitable timing for a departure time from the rest facility.

Embodiment 2

Figure 5:
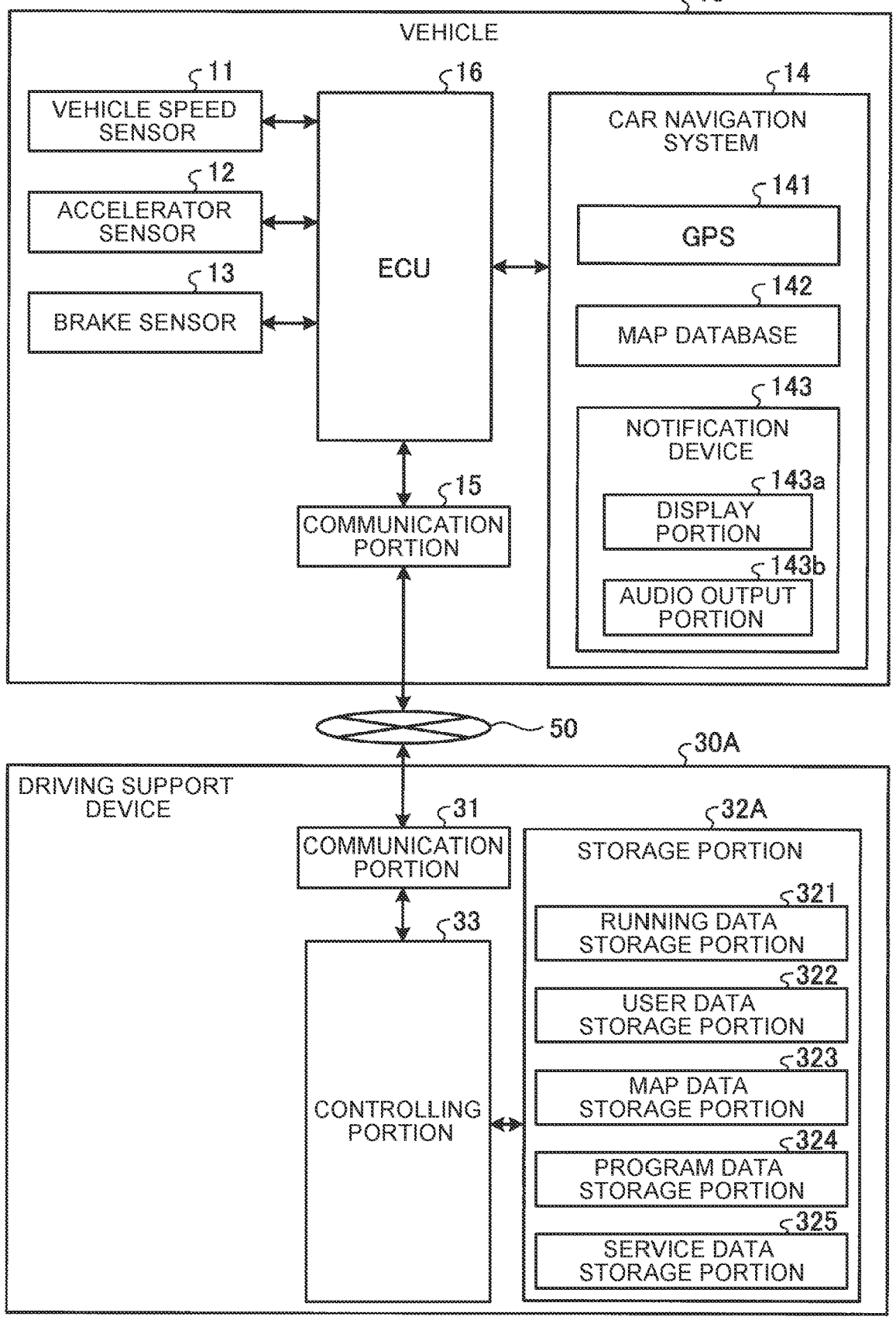
FIG. 5 is a block diagram illustrating functional configurations of a vehicle and a driving support device according to Embodiment 2.

Next will be described Embodiment 2. FIG. 5 is a block diagram illustrating functional configurations of a vehicle and a driving support device according to Embodiment 2. Note that the same constituent as that of the driving support system 1 in Embodiment 1 has the same reference sign as in Embodiment 1, and its description is omitted.

A driving support device 30A illustrated in FIG. 5 includes a storage portion 32A instead of the storage portion 32 of Embodiment 1. The storage portion 32A further includes a service data storage portion 325 in addition to the configuration of the storage portion 32 in Embodiment 1. In the service data storage portion 325, service information associated with each rest facility is stored. Here, the service information includes coupon data, discount coupon data, service point data, and the like usable in the rest facility where the vehicle 10 stops.

Process of Driving Support Device

Figure 6:
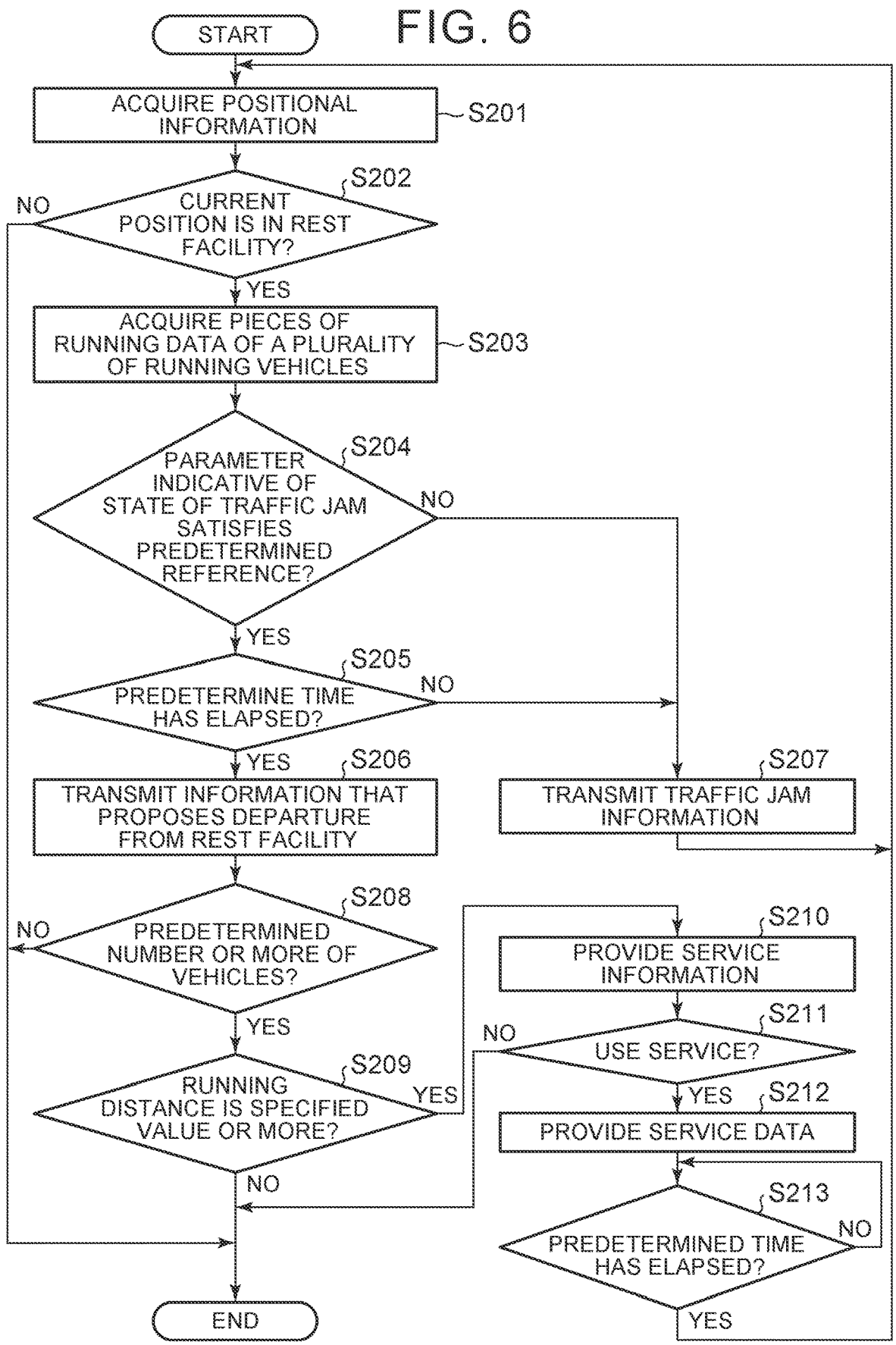
FIG. 6 is a flowchart illustrating the outline of a process executed by the driving support device according to Embodiment 2.

Next will be described a process executed by the driving support device 30A. FIG. 6 is a flowchart illustrating the outline of the process executed by the driving support device 30A. Note that, in order to simplify a description, the following description deals with a case where the driving support device 30A performs the process on one vehicle 10.

In FIG. 6, step S201 to step S204 correspond to step S101 to step S104 in FIG. 3.

In step S205, the controlling portion 33 determines whether or not a predetermined time has elapsed after the vehicle 10 is placed inside the rest facility. When the predetermined time has elapsed after the vehicle 10 is placed inside the rest facility (step S205: Yes), the controlling portion 33 transmits, to the device related to the vehicle 10, information that proposes a departure from the rest facility (step S206). After step S206, the driving support device 30A shifts to step S208 (described later). Hereby, the display 210 of the user terminal device 20 displays the information that proposes a departure from the rest facility, the information being received from the driving support device 30 via the network 50. As a result, the user of the vehicle 10 can grasp a timing to depart from the rest facility in real time in a state where the user takes a sufficient rest.

In step S205, when the predetermined time has not elapsed after the vehicle 10 is placed inside the rest facility (step S205: No), the driving support device 30A shifts to step S207. Step S207 corresponds to step S106 in FIG. 3. After step S207, the driving support device 30A returns to step S201.

In step 208, the controlling portion 33 determines whether or not the number of vehicles 10 that can depart from the rest facility is a predetermined number or more, e.g., 100 or more, based on respective pieces of positional information of the vehicles 10. When the controlling portion 33 determines that the number of vehicles 10 that can depart from the rest facility is the predetermined number or more (step S208: Yes), the driving support device 30A shifts to step S209 (described later). On the other hand, when the controlling portion 33 determines that the number of vehicles 10 that can depart from the rest facility is not the predetermined number or more (step S208: No), the driving support device 30A finishes this process.

In step S209, the controlling portion 33 determines whether or not a running distance of the vehicle 10 is a specified value or more, based on running data of the vehicle 10, the running data being stored in the running data storage portion 321. When the controlling portion 33 determines that the running distance of the vehicle 10 is the specified value or more (step S209: Yes), the driving support device 30A shifts to step S210 (described later).

In step S209, when the controlling portion 33 determines that the running distance of the vehicle 10 is not the specified value or more (step S209: No), the driving support device 30A finishes this process. In this case, the controlling portion 33 promotes a departure to a user whose running distance by the vehicle 10 is less than the specified value (e.g., 50 km) and who is assumed to be less tired by driving than other users inside the rest facility, thereby making it possible to prevent a traffic jam by the vehicles 10 to leave the rest facility.

Figure 7:
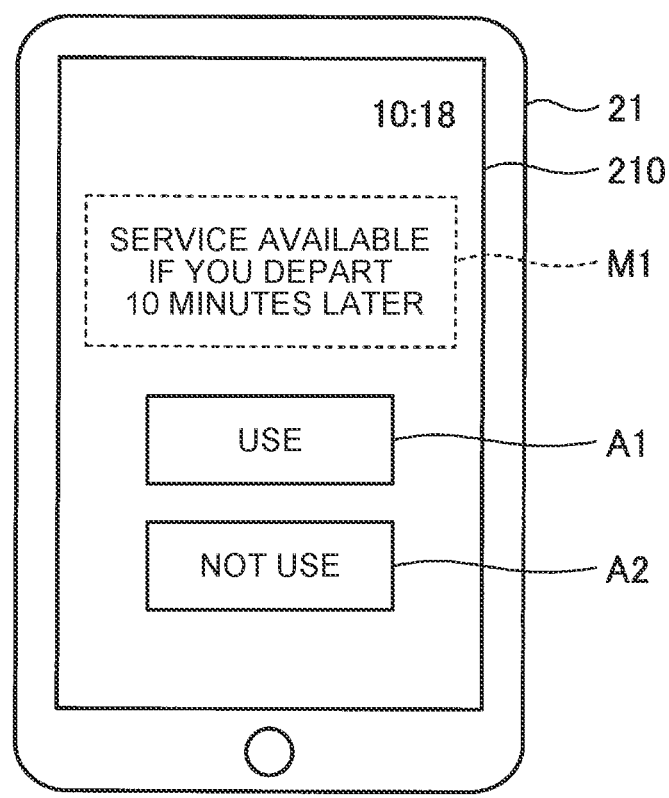
FIG. 7 is a view illustrating an example of service information displayed on a user terminal device according to Embodiment 2.

In step S210, based on service data stored in the service data storage portion 325, the controlling portion 33 provides service information that suggests the user not to depart from the rest facility, to the device related to the vehicle 10 via the communication portion 31 and the network 50. In this case, as illustrated in FIG. 7, the display 210 of the user terminal device 20 displays the service information received from the driving support device 30A via the network 50. The service information includes a message M1 that informs provision of a service to suggest the user not to depart from the rest facility, and icons A1, A2 via which input of whether the user uses the service or not is received. The icon A1 receives input of an instruction signal indicating that the user uses the service. The icon A2 receives input of an instruction signal indicating that the user does not use the service.

Subsequently, when the controlling portion 33 receives the instruction signal indicating that the user uses the service from the user terminal device 20 via the network 50 and the communication portion 31 (step S211: Yes), the controlling portion 33 gives service data usable in the rest facility where the vehicle 10 is placed to the device related to the vehicle 10 via the communication portion 31 and the network 50 (step S212). Here, the service data includes coupon data, discount coupon data, and service point data usable in the rest facility. Hereby, in terms of users who take a sufficient rest inside the rest facility, even when the parameter on the roads ahead of and behind the rest facility satisfy the predetermined reference, a predetermined number or more of the vehicles 10 that can depart from the rest facility are held back in the rest facility, so that it is possible to prevent a traffic jam from being caused when the vehicles 10 leave the rest facility all at once.

After that, the controlling portion 33 determines whether or not a predetermined time has elapsed after the service information is given to the device related to the vehicle 10 (step S212). When the controlling portion 33 determines that the predetermined time has elapsed after the service information is given to the vehicle 10 (step S213: Yes), the driving support device 30A returns to step S201. On the other hand, when the controlling portion 33 determines that the predetermined time has not elapsed after the service information is given to the vehicle 10 (step S213: No), the driving support device 30A repeats step S212 until the predetermined time has elapsed.

In step S211, when the controlling portion 33 does not receive the instruction signal indicating that the user uses the service from the user terminal device 20 via the network 50 and the communication portion 31 (step S211: No), the driving support device 30A finishes this process.

With Embodiment 2 described above, in a case where the vehicle 10 is placed inside the rest facility and the parameter ahead of the rest facility satisfies the predetermined reference, when the predetermined time has elapsed after the vehicle 10 is placed inside the rest facility, the controlling portion 33 transmits information that proposes a departure from the rest facility, so that the user of the vehicle 10 can depart at a timing when the user takes a sufficient rest.

Further, with Embodiment 2, in a case where the vehicle 10 is placed inside the rest facility and the parameter ahead of the rest facility is a specified value or less, when the number of vehicles 10 placed inside the rest facility is a predetermined number or more, the controlling portion 33 provides service data such as coupon data usable in the rest facility to the device related to the vehicle 10. Accordingly, even when a departure timing comes, the predetermined number or more of vehicles 10 that can depart from the rest facility are held back in the rest facility, so that it is possible to prevent a traffic jam from being caused ahead of the rest facility.

Further, with Embodiment 2, in a case where the running distance of the vehicle 10 is a specified value or more, the controlling portion 33 provides service data such as coupon data usable at least in the rest facility to the device related to the vehicle 10. Hereby, a user who is assumed to be more tired than other users inside the rest facility is held back in the rest facility, so that the user can recover from fatigue.

Other Embodiments

Further, in the driving support devices according to Embodiments 1, 2, "portions" described above can be regarded as "circuits" or the like. For example, the controlling portion can be regarded as a control circuit.

Further, the program to be executed by the driving support devices according to Embodiments 1, 2 is provided by being recorded in a recording medium readable by a computer, e.g., a CD-ROM, a flexible disk (FD), a CD-R, a digital versatile disk (DVD), a USB medium, or a flash memory, as file data in an installable or executable manner.

Further, the program to be executed by the driving support devices according to Embodiments 1, 2 may be stored in a computer connected to a network such as the Internet and provided by downloading via the network.

Note that, in the description about the flowcharts in the present specification, the context of processes of steps is exhibited by use of expressions such as "first," "after that," and "subsequently." However, the order of processes necessary to carry out the embodiments is not determined uniquely by those expressions. That is, the order of the processes in the flowcharts described in the present specifications can be changed within a consistent range.

Further effects and modifications can be easily derived by a person skilled in the art. A wider variety of aspects of the disclosure are not limited to specific details and representative embodiments expressed and described above. Accordingly, various changes can be made without departing from the spirit or scope of a general concept of the disclosure.

What is claimed is:

1. A driving support device comprising
a memory; and
a processor including hardware, wherein:
the processor is configured to determine, based on positional information of a vehicle, that the vehicle is inside a rest facility;
the processor is configured to determine, based on running data of a plurality of running vehicles running on roads ahead of and behind the rest facility, that at least one parameter indicative of a change in traffic jams on the roads ahead of and behind the rest facility while the vehicle is in the rest facility satisfies a predetermined reference; and
the processor is configured to transmit, to a device related to the vehicle, information that proposes a departure from the rest facility in response to the determination that the at least one parameter satisfies the predetermined reference.

2. The driving support device according to claim 1, wherein:
the processor is configured to determine, based on the positional information of the vehicle, that a predetermined time has elapsed after the vehicle is inside the rest facility; and
the processor is configured to transmit the information when the predetermined time has elapsed.

3. The driving support device according to claim 2, wherein:
the processor is configured to determine, based on respective pieces of positional information of the vehicles, that the number of vehicles inside the rest facility is at least a predetermined number; and
the processor is configured to transmit service information usable in the rest facility to respective devices related to the vehicles inside the rest facility when the number of vehicles is at least the predetermined number.

4. The driving support device according to claim 3, wherein:

the processor is configured to determine, based on running data of the vehicle, that a running distance of the vehicle is at least a specified value; and the processor is configured to transmit the service information when the running distance of the vehicle is at least the specified value.

5. The driving support device according to claim 1, wherein, when the parameter does not satisfy the predetermined reference, the processor is configured to transmit traffic jam information indicative of follow-up states of the traffic jams per predetermined time to the device related to the vehicle.

6. A driving support method executed by a driving support device, the driving support method comprising:
   reading positional information of a vehicle from a memory;
   determining, based on the positional information, that the vehicle is inside a rest facility;
   reading, from the memory, running data of a plurality of running vehicles running on roads ahead of and behind the rest facility;
   determining, based on the running data of the running vehicles, that at least one parameter indicative of a change in traffic jams on the roads ahead of and behind the rest facility while the vehicle is in the rest facility satisfy a predetermined reference; and
   transmitting, to a device related to the vehicle, information that proposes a departure from the rest facility in response to determining that the at least one parameter satisfies the predetermined reference.

7. A non-transitory computer readable storage medium including a program configured to be executed by a driving support device, the program causing the driving support device to:
   determine, based on positional information of a vehicle, that the vehicle is inside a rest facility;
   determine, based on running data of a plurality of running vehicles running on roads ahead of and behind the rest facility, that at least one parameter indicative of a change in traffic jams on the roads ahead of and behind the rest facility while the vehicle is in the rest facility satisfy a predetermined reference; and
   transmit, to a device related to the vehicle, information that proposes a departure from the rest facility in response to the determination that the at least one parameter satisfies the predetermined reference.

* * * * *